(12) United States Patent
Tanumihardja et al.

(10) Patent No.: US 10,419,716 B1
(45) Date of Patent: Sep. 17, 2019

(54) AD-HOC DYNAMIC CAPTURE OF AN IMMERSIVE VIRTUAL REALITY EXPERIENCE

(71) Applicant: Vulcan Inc., Seattle, WA (US)

(72) Inventors: Mars Tanumihardja, Seattle, WA (US); Joseph Laurino, Sammamish, WA (US); Ashly Yeo, Bothell, WA (US)

(73) Assignee: Vulcan Technologies LLC, Seattle, WA (US)

( * ) Notice: Subject to any disclaimer, the term of this patent is extended or adjusted under 35 U.S.C. 154(b) by 0 days.

(21) Appl. No.: 15/853,295

(22) Filed: Dec. 22, 2017

Related U.S. Application Data

(60) Provisional application No. 62/526,305, filed on Jun. 28, 2017.

(51) Int. Cl.
*H04N 5/775* (2006.01)
*G09B 9/00* (2006.01)
(Continued)

(52) U.S. Cl.
CPC ............. *H04N 5/775* (2013.01); *G06F 3/011* (2013.01); *G06T 19/003* (2013.01);
(Continued)

(58) Field of Classification Search
None
See application file for complete search history.

(56) References Cited

U.S. PATENT DOCUMENTS 7,649,537 B2  1/2010  Campbell et al.
9,094,675 B2  7/2015  Lukk et al.
(Continued)

FOREIGN PATENT DOCUMENTS

GB  2537438  10/2016

OTHER PUBLICATIONS

"3 Types of VR Capture," Boost VC, retrieved on the Internet on May 27, 2017, at https://medium.com/boost-vc/3-types-of-vr-capture-132d7eb01a57, 4 pages.
(Continued)

*Primary Examiner* — Eileen M Adams
(74) *Attorney, Agent, or Firm* — Ellen M. Bierman; Lowe Graham Jones PLLC (57) ABSTRACT

Methods, systems, and techniques for projecting streamed video are provided. An Example Surround Video Projection System (SVPS) provides support for interacting with the displayed virtual reality environment, capturing a video of a user in the VR environment, and displaying the VR environment on deformations. Also, the SVPS may change the displayed VR environment responsive to attributes and/or characteristics of the user. In one example, the SVPS comprises a real time, interactive rendering system, a display system, and one or more display units. The rendering system comprises a high resolution graphics engine capable of generating high resolution video. The projection system comprises video capture cards to capture the generated video stream and forward it to a projection mapping engine. The projection mapping engine consolidates and stitches together the received video stream as appropriate to render the video stream over display units to the target viewing environment such as a dome/sphere.

20 Claims, 8 Drawing Sheets

(51) Int. Cl.
H04N 5/92 (2006.01)
G06F 3/01 (2006.01)
G06T 19/00 (2011.01)
G09B 19/00 (2006.01)

(52) U.S. Cl.
CPC ............ *G06T 19/006* (2013.01); *G09B 9/003* (2013.01); *G09B 19/003* (2013.01); *H04N 5/92* (2013.01)

(56) References Cited

U.S. PATENT DOCUMENTS

| | | | |
|---|---|---|---|
| 2008/0043100 A1* | 2/2008 | Sobel | H04N 7/144 348/139 |
| 2012/0176481 A1 | 7/2012 | Lukk et al. | |
| 2013/0093788 A1* | 4/2013 | Liu | G06F 3/011 345/633 |
| 2014/0063061 A1* | 3/2014 | Reitan | G09G 3/003 345/633 |
| 2016/0042656 A1* | 2/2016 | Lee | G09B 9/00 434/219 |
| 2017/0069134 A1 | 3/2017 | Shapira et al. | |
| 2017/0095732 A1 | 4/2017 | Ghaffari et al. | |
| 2017/0104980 A1 | 4/2017 | Tran et al. | |
| 2017/0336705 A1 | 11/2017 | Zhou et al. | |
| 2018/0084293 A1 | 3/2018 | Nehru | |
| 2018/0091767 A1 | 3/2018 | Geng | |

OTHER PUBLICATIONS

"A Brief Introduction to Photogrammetry and Remote Sensing," GIS Lounge, retrieved on the Internet on May 26, 2017, at https://www.gislounge.com/a-brief-introduction-to-photogrammetry-and-remote-sensing/, 3 pages.

"Become the Virus in Zero Days VR: A Revolutionary Immersive Documentary," VRScout, retrieved on the Internet on May 27, 2017, at https://vrscout.com/news/zero-days-vr-revolutionary-immersive-documentary/, 12 pages.

Lang, Ben, "Believe the Hype: HypeVR's Volumetric Video Capture is a Glimpse at the Future of VR Video," Jan. 10, 2017, retrieved on the Internet on May 28, 2017, at http://www.roadtovr.com/believe-hype-hypevrs-volumentric-video-capture-glimpse-future-vr-video, 4 pages.

Bourke, Paul, "Converting to/from cubemaps," Nov. 2003, updated May 2006 and Jul. 2016, 9 pages.

Lee, Nicole, "Facebook's new 360 cameras bring exploration to live videos," engadget.com, Apr. 19, 2017, 10 pages.

"Getting the real into virtual reality," Reality Capture, Graham Wakefield, 2016, retrieved on the Internet on May 27, 2017, at http://grrrwaaa.github.io/courses/film6246/real.html, 6 pages.

Miller, Julie, "How Lady Gaga Turned into David Bowie for Her 2016 Grammys Performance," Vanity Fair, Feb. 15, 2016, retrieved on the Internet on May 28, 2017, at http://www.vanityfair.com/hollywood/2016/02/lady-gaga-2016-grammys-david-bowie-performance-video, 5 pages.

Mufson, Beckett, "How to See Stuxnet? 'Zero Days' Filmmakers Find an Unlikely Answer in VR," Creators, Jan. 26, 2017, retrieved on the Internet on May 27, 2017, at https://creators.vice.com/en_us/article/zero-days-vr-sundance-debut, 8 pages.

"OTOY and Facebook Release Revolutionary 6DOF Video VR Camera Pipeline and Tools," Apr. 21, 2017, retrieved on the Internet on May 30, 2017, through https://home.otoy.com/, 5 pages.

"Photogrammetry," from Wikipedia, retrieved on the Internet on May 26, 2017, at https://en.wikipedia.org/wiki/Photogrammetry, 5 pages.

Maimone, Andrew et al., "Real-Time Volumetric 3D Capture of Room-Sized Scenes for Telepresence," Department of Computer Science, University of North Carolina at Chapel Hill, 4 pages.

George, James, "The Brief History of Volumetric Filmmaking," retrieved on the Internet on May 27, 2017, at https://medium.com/volumetric-filmmaking/the-brief-history-of-volumetric-filmmaking-32b3569c6831, 18 pages.

"Networking Overview," Unity Manual, unity3d.com, retrieved on the Internet on May 28, 2017, at https://docs.unity3d.com/Manual/UNetOverview.html?_ga=2.122379275.1073641429.1496002446-647492717.1486775837, 3 pages.

"Network System Concepts," Unity Manual, unity3d.com, retrieved on the Internet on May 28, 2017, at https://docs.unity3d.com/Manual/UNetConcepts.html?_ga=2.165173055.1073641429.1496002446-647492717.1486775837, 4 pages.

"Using the Network Manager," Unity Manual, unity3d.com, retrieved on the Internet on May 28, 2017, at https://docs.unity3d.com/Manual/UNetManager.html, 10 pages.

Machkovech, Sam, "Volumetric capture is the swift kick in the butt VR so desperately needs," Ars Technica, Mar. 21, 2017, retrieved on the Internet on May 26, 2017, at https://arstechnica.com/gaming/2017/03/volumetric-capture-is-the-swift-kick-in-the-butt-vr-so-desperately-needs/, 5 pages.

Terdiman, Daniel, "Why Volumetric VR Is The Real Future Of Virtual Reality," Fast Company Newsletter, Dec. 9, 2015, retrieved on the Internet on May 26, 2017, at https://www.fastcompany.com/3054317/why-volumetric-vr-is-the-real-future-of-virtual-reality, 7 pages.

Bourke, Paul, "Workflow for creating 360 spherical (equirectangular) panoramas," Dec. 2013, retrieved on the Internet on Feb. 10, 2017, at http://paulbourke.net/miscellaneous/sphericalpano/, 8 pages.

\* cited by examiner

AD-HOC DYNAMIC CAPTURE OF AN IMMERSIVE VIRTUAL REALITY EXPERIENCE

CROSS-REFERENCE TO RELATED APPLICATION

This application claims the benefit of priority from U.S. Provisional Patent Application No. 62/526,305, filed on Jun. 28, 2017, which application is incorporated herein by reference in its entirety.

TECHNICAL FIELD

The present disclosure relates to methods, techniques, and systems for enhancing a virtual reality environment and, in particular, to methods, techniques, and systems for using augmented reality, projecting objects, interacting with objects, chronicling individualized virtual reality experiences, and adjusting virtual reality experiences, all within or associated with a virtual reality environment.

BACKGROUND

Virtual reality environments are becoming more realistic. However, when displayed on a screen or wall, they are still two dimensional. This limits interactivity with these environments. The environment also does not adjust for attributes of the viewer.

Accordingly, the potential immersive experience may be diminished.

DETAILED DESCRIPTION

The world of real time (near real time) virtual reality (VR) and augmented reality (AR) content calls upon the ability for large amounts of video data to be generated and displayed to a user quickly whether on a computer or television display or whether projected onto a screen or some other object. Moreover, the data may change rapidly such as to depict a scene in motion, to respond to a user's motion, or to interact with a user. For example, when a user is playing a video game where the user participates, as the user moves, the environment and objects are modified, sometimes even continuously, consistent with the "game map"—an internal map directing where the objects including the user exist in the hypothetical world of the game. This internal map is used to determine what needs to be rendered on a display and when it should be displayed. In a classical depiction rendered on a computer display screen, for example, the gaming system doesn't have to display what is "behind" the user unless the user turns to look in that direction. This generally holds true in a VR or AR environment as well when the viewpoint being depicted originates from a user placed within the world, such as from a user's point of view.

For the purposes of this disclosure, real time refers to almost real time, near real time, or time that is perceived by a user as substantially simultaneously responsive to activity. Augmented reality (as the term is typically used) refers to technology that superimposes one or more computer-generated images on a user's view of the real world, thus providing a composite view of what a user sees. Virtual reality refers to computer-generated simulation of an image or environment that can be interacted with in a seemingly real or physical way by a person. In some instances a virtual reality simulation is interacted with by a person unadorned with specialized equipment. In other instances, virtual reality simulation is interacted with using specialized equipment such as a VR helmet, gloves with sensors, and the like.

In some environments, a need for streaming the video data to a location that is separate or distinct from (e.g., not directly connected to) the generated video may be desired. For example, when it is desired to portray a scene, such as in a movie, augmented reality depiction, or virtual reality depiction, it may be required to stream and project video data onto one or more screens, displays, or three dimensional objects. The video data may be projected or rendered using display systems or display units such multiple projectors depending upon the intended projection "view." For example, to implement a "surround video" system, video data may be projected using multiple projectors (or otherwise displayed) to provide a 360 degree view of a scene. Other environments, for example, a panorama 180 degree view, may require fewer projectors or display systems. In some such environments a user may even be allowed to walk around within a space defined by the projection that enables the user to view the surrounding video from many different vantage points (the projection thus physically surrounding the user). A surround video system thus includes projecting or rendering different data than might otherwise be necessary to display on a classical computer screen where objects occluded by or behind the user need not be displayed. In addition, different problems are presented when a user interacts with a surround video system where the simulation moves around the user.

Figure 1:
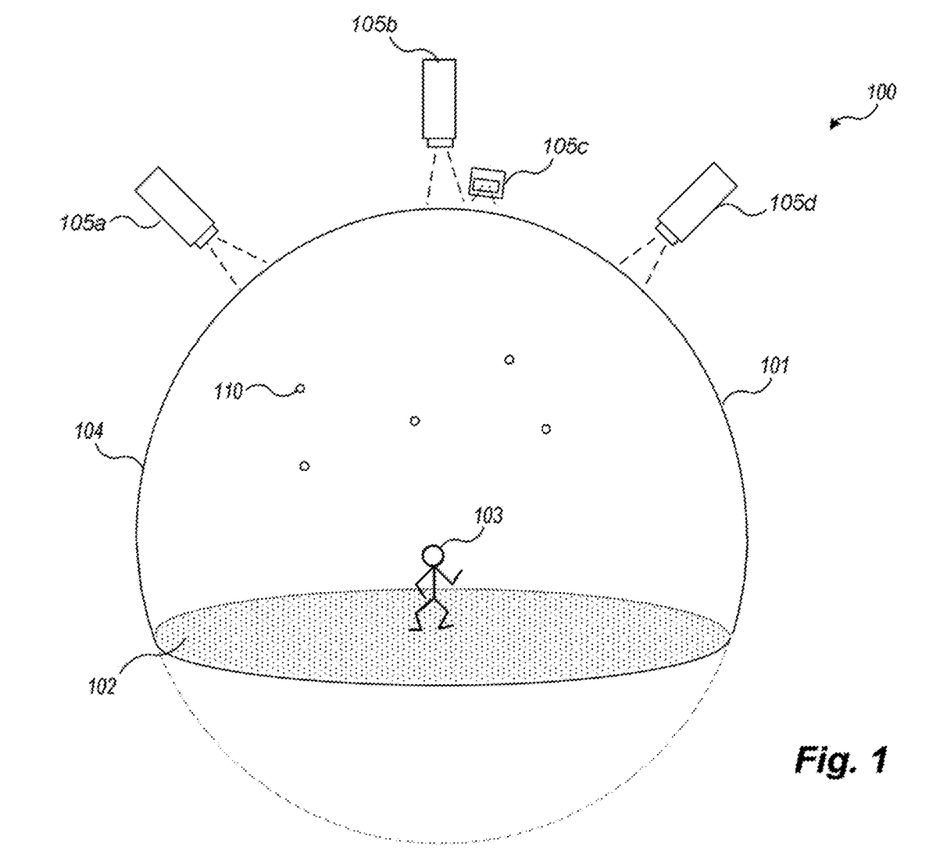
FIG. 1 is an example block diagram illustrating a scenario of a surround video system that uses multiple projectors to project streamed 360 degree video data to a portion of a sphere.

FIG. 1 is an example block diagram illustrating a scenario of a surround video system that uses multiple projectors to project streamed 360 degree video data to a portion of a sphere. The environment 100 shown in FIG. 1 may be used for example to project a 360 degree virtual reality (VR) scenario where a user 103 stands on a floor 102, which is a plane that bisects the sphere at some point, and the projectors 105a-105d project streamed video data that depicts a scene on the spherical shaped walls 101 of the environment

100. The scene may appear to be two, two and a half, or three-dimensional (2D, 2½ D, or 3D). Although the projection appears to be shown in FIG. 1 as a portion of a sphere, the projection may be spherical in nature and a 2D, 2½ D or 3D effect shown on the floor 102 as well, even though the floor 102 may be a flat plane. To provide this 360 degree spherical projection, four projectors 105a-105d are employed. Projectors 105a, 105c, and 105d project images on the "walls" and "ceiling" whereas projector 105b projects an image on the floor. Perforations 110 also may be present to allow hidden devices such as video cameras (not shown) access to the interior of the environment 100, as discussed further below. In addition, actuators (not shown) may be present behind the walls 101 to allow deformations of the walls 101, as discussed further below.

A 360 degree video (sometimes referred to as VR video or VR panorama video) is a video recording in which footage from "every" direction (in at least 90 degree increments) is recorded and/or generated at the same time. When this video is streamed for projection purposes, the generated video must be captured by video capture technology, stitched together properly (e.g., warped, mapped, and masked) to create the 360 degree or "x" degree panorama image/video, and then projected or displayed as desired. The images shown by the projectors (videos are considered moving images for the purpose of this disclosure) are stitched together and blended using known software techniques. For example, "TouchDesigner" software, produced by Derivative, with some enhancements is used to create real time 2D and 3D (VR) "projection mappings" from video input for display on a portion of a sphere such as the walls 101 and floor 102 of environment 100. Other software or techniques may be similarly employed. A projection mapping maps light onto any surface and can be used to turn any three-dimensional object, such as environment 100, into an interactive display.

The environment shown in FIG. 1 provides one example of a surround video system. Different projections for different types of projection environments such as domes, rectangles, triangles, polygon shapes, etc., may be performed in similar manners. In addition, the same or different numbers of display systems (e.g., projectors), placed in the same or different positions, may be used depending upon the ultimate shape of the projected environment.

Embodiments described herein provide enhanced computer- and network-based methods, techniques, and systems for interaction with virtual reality objects depicted in a surround video environment. The surround video environment provides a Surround Video Projection System ("SVPS"), which enables the projection of video in real time. An SVPS can capture and render a real time video stream to display a 360 degree video surround environment in the portion of the sphere depicted by FIG. 1.

Although the techniques of an Surround Video Projection System are generally applicable to any type of video, the phrase "video" is used generally to imply any type of video, including a still image, sequence of images, real time image stream, etc. Also, although the examples described herein often refer to a surround video environment or surround video projection environment, the techniques described herein can also be used by other shapes of environments where the video does not surround the user. Essentially, the concepts and techniques described are applicable to any video production environment. Also, although certain terms are used primarily herein, other terms could be used interchangeably to yield equivalent embodiments and examples. In addition, terms may have alternate spellings which may or may not be explicitly mentioned, and all such variations of terms are intended to be included.

Example embodiments described herein provide applications, tools, data structures and other support to implement an Surround Video Projection System to be used for streaming high resolution video. Other embodiments of the described techniques may be used for other purposes. In the following description, numerous specific details are set forth, such as data formats and code sequences, etc., in order to provide a thorough understanding of the described techniques. The embodiments described also can be practiced without some of the specific details described herein, or with other specific details, such as changes with respect to the ordering of the logic, different logic, etc. Thus, the scope of the techniques and/or functions described are not limited by the particular order, selection, or decomposition of aspects described with reference to any particular routine, module, component, and the like.

Figure 2:
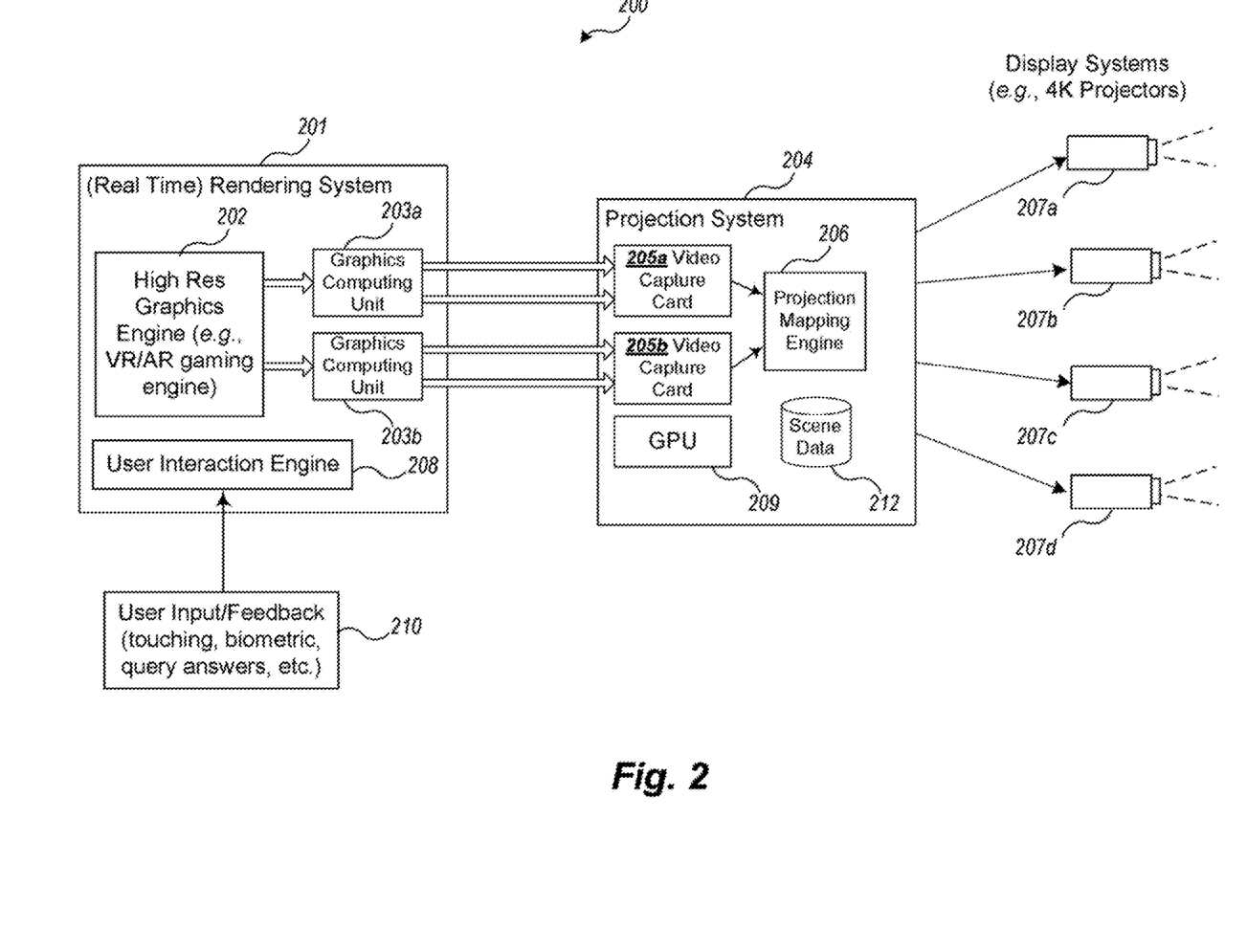
FIG. 2 is an example block diagram of components of an Surround Video Projection System according to example embodiments.

FIG. 2 is an example block diagram of components of an example Surround Video Projection System according to example embodiments. In one example embodiment, the SVPS 200 comprises one or more functional components/modules that work together to deliver high bandwidth, high resolution video streams for projection in real time. For example, SVPS 200 may comprise one or more rendering systems 201 (such as a real time, interactive rendering system), one or more projection systems 204, and one or more display systems, here four projectors 207a-207d. Using the interactive and adaptive techniques described below, input and/or feedback may be fed back into the SVPS 200 system using modules 210.

In an example SVPS, rendering system 201 comprises a high resolution graphics engine 202 (such as a VR/AR gaming engine) capable of generating high resolution video and two graphics computation units such as graphics processing units (GPUs) 203a and 203b. Other graphics computation units such as fast CPUs or other processing units may also be employed. Projection system 204 comprises two video capture cards 205a and 205b to capture the video stream generated by GPUs 203a and 203b, and forwards the captured video stream to a projection mapping engine 206. (Other numbers of GPUs and video capture cards can be accommodated.) Projection mapping engine 206 consolidates and stitches together the received video stream as appropriate to project the video stream over display systems such as projectors 207a-207b to the target viewing environment (such as the portion of the sphere 100 depicted in FIG. 1). In some example projection systems 204, a GPU 209 is available for processing the video data and storage 212 is available for buffering, caching or other purposes.

In the process of generating and capturing a video stream to be projected as a spherical panoramic view, an "equirectangular" map (EM), also referred to as an equirectangular panorama or equirectangular map projection, is created and transferred to the projection system 204 to be projected as a 360 degree video image. This EM is warped, mapped, and masked and stitched together to create the target viewing environment. (See Bourke, Workflow for creating 360 spherical (equirectangular) panoramas, December 2013, incorporated herein by reference in its entirety.) An EM represents a top, bottom, front, left, right, back left, back right as a single map. This EM may be used for other purposes as explained below, such as for augmenting the VR environment with additional AR elements.

Ad-Hoc Dynamic Capture of an Immersive VR Experience

In certain scenarios, a user such as user 103 in FIG. 1 immersing himself or herself in a virtual reality experience in the Surround Video Projection System (SVPS) 100 may desire to communicate that experience outside the SVPS. For example, if the SVPS is projecting a musical or gaming experience that the user is taking part in (e.g., playing a musical instrument or taking the role of a starship captain), the user may desire to take home a "souvenir" that the user can "re-play" (e.g., playback, re-experience, re-present, re-display, etc.) using a VR device such as a VR headset (e.g., Google Cardboard, Oculus Rift, HTC Vive, Microsoft Hololens, etc.). The playback presentation and/or representation outside the original SVPS may entail exploring the VR environment and the user's interaction within it. In addition, the playback, presentation and/or representation may be communicated as the event occurs within the SVPS (appearing to be simultaneously, or near simultaneously occurring with the event) or at some later time. Further, the presentation of a captured interaction may be used to broadcast events happening inside an SVPS, to analyze an interaction, to simulate an experience or interaction (e.g., to replicate it at another time), to teach others how to do something, and the like.

The VR environment and user interactions with it can occur in a variety of scenarios that lend themselves to ad-hoc dynamic capturing (e.g., journaling, recording, and the like) of an immersive VR experience. For example, in one scenario, the VR environment is used for training purposes such as personal training in an exercise venue or for medical rehabilitation. In this scenario, the VR environment may simulate various fitness programs and/or devices and the user interacts with the environment to perform one or more fitness exercises. The environment and the user's interactions are captured for posterity and analysis so that a personal trainer or rehabilitation coach can view the immersive experience in real time (e.g., concurrently, simultaneously, etc.) or at a later time and provide feedback to the user based upon watching the user from many different viewpoints. In this manner, the personal trainer can provide enhanced coaching that may not otherwise occur by just watching the user do the exercises in front of him.

As another example, the VR environment may be used to provide a simulation in a military or fire-fighting scenario or the like. This provides a much safer environment for determining whether someone is ready for the field and/or for training them especially when training in the live situation may be life threatening. In the SVPS, the user can stand in various positions, be confronted with a multitude of different scenarios, and interact with the VR environment as appropriate. The coach, mentor, advisor, professional trainer, or other person not in the VR environment within the SVPS (an outsider located outside the SVPS) can analyze the behavior of the user interacting with the simulation and identify what changes in the user's behavior, movement patterns, reactions are desirable. Note that in some instances, where the user is replaying the user's own experience, the user is the "outsider."

For example, using the dynamically captured VR experience, the outsider can recreate the scene using a different VR device and move around the user and within the environment to see how the user reacted, where the user was standing at different times, holding objects, etc. For example, the outsider may notice that the fire-fighter placed his hose too close to the oncoming blaze too early and at an angle that was likely to disperse the flame and cause it to flare up. Had the fire-fighter in the simulation waiting another couple of seconds and held the hose at a slightly different angle, the fire may have been better contained. Other examples abound.

In these and other scenarios, the first step is to dynamically capture, in real time or near real-time, the interactions and movements of the user along with the immersive "background" provided by the virtual reality experience. For the purposes of this disclosure, real time refers to almost real time, near real time, or time that is perceived by a user as substantially simultaneously responsive to activity.

To provide dynamic capture of a VR immersive experience, the SVPS provides a capture engine as part of the projection system 204 of FIG. 2 or as a separate component (not shown). The capture engine is able to use video capturing techniques, such as volumetric capture, with enhancements specific to a SVPS environment to produce a three dimensional (3D) video of objects in the SVPS that can be viewed in 360 degrees and manipulated to reflect the viewpoint of the outsider using the external viewing device (e.g., the VR headset) to replay the captured VR experience. The enhancements are needed because the VR environment displayed within the SVPS is a two dimensional "picture" which does not lend itself to the three dimensional canvas that current volumetric capture techniques depend on to gather depth data of the points of an object relative to a real world background.

Specifically, volumetric capture is a technique for presenting a 360 degree view of a three dimensional object (for example, a person) using video cameras. The video cameras are able collect 3D data points (x,y,z voxels) of the object at many frames per second (e.g., 60 frames per second) using at least 3 cameras which allow the objects to be viewed at any angle. For the purposes of this disclosure, a voxel is a volume element—a value on a regular grid in three dimensional space (analogous to a pixel in two dimensional space). Some versions of volumetric capture use a green screen to isolate the object from its background so it can be recreated or placed in an alternative environment such as a VR environment. (See the YouTube video of Microsoft's work to produce photorealistic content at youtube.com/watch?v=kZ-XZIV-obs, incorporated by reference in its entirety.)

Other versions of volumetric capture isolate the object from a real world background using depth mapping such as LiDAR (which bounces lasers off of objects to determine how far away they are) to separate the object from the background. This uses depth measurements to perform edge detection since no green screen technique is available. For example, work done by HypeVR which captures volumetric data of a scene for each frame so that, when the world is played back, there is enough 3D information to enable a viewer to move inside the video and the change the environment commensurate with the viewer's viewpoint. The HypeVR approach uses a video camera with LiDAR and captures a scene 60 times per second. The texture data from the video is later fused with depth data to create 60 volumetric frames of (3D data of) the scene per second allowing a user to see motion (like waves moving) yet still allow a viewer to "move" within a portion of the capture. (See Ben Lang, *Believe the Hype: HypeVR's Volumetric Video Capture is a Glimpse at the Future of VR Video*, Jan. 10, 2017, at roadtovrcom/believe-hype-hypevrs-volumetric-video=capture-glimpse-future-vr-video; see also U.S. Patent Application 2017/0104980 by Tran et al., all of which are incorporated by reference herein in their entireties.)

Volumetric capture allows viewers to shift their points of view and see appropriate parallax effects in contrast to a 360 degree video which locks the viewer into a single vantage point. Using 360 degree video, if the viewer moves his/her head, or walks around "inside" the video, the scene does not change accordingly. When the virtual view doesn't line up with the viewer's movements, the world feels less real and less comfortable. Thus a 360 degree video recording produces less of an immersive experience when it is replayed outside of the SVPS environment. Another technique, photogrammetry utilizes a multitude of 2D photographs to build a 3D image but cannot be used to record an object in motion. (See, TGA Digital—Photogrammetry Overview, youtube-.com/watch?v=GEsRcFQ1_H8, incorporated by reference herein in its entirety.) In some situations, it can be used to supplement a volumetric capture in that a 3D model it generates can be used to fill in "volumetric holes" created by the volumetric capture process. However, in the SVPS environment, where the object is moving, this is difficult.

Figure 3:
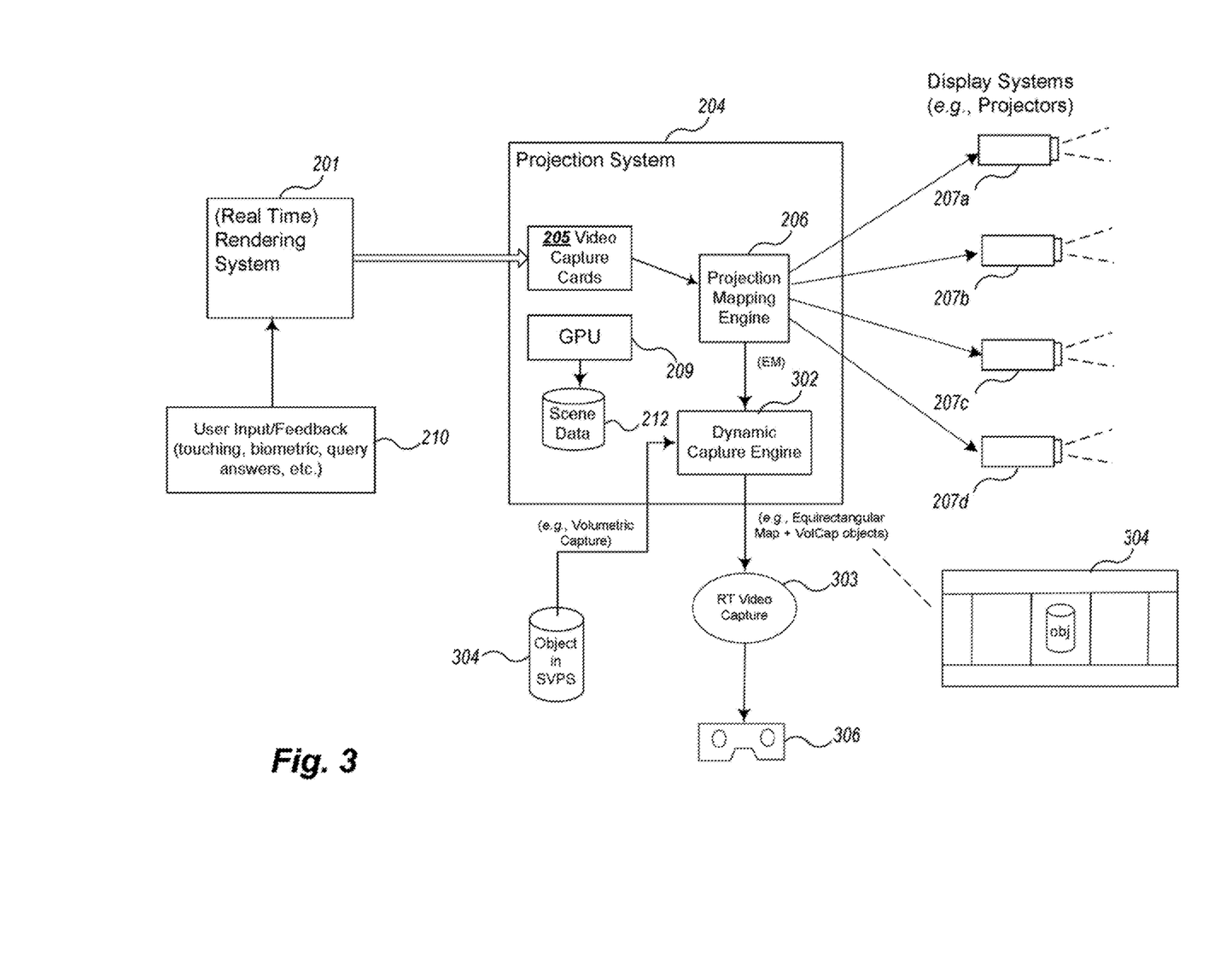
FIG. 3 is a block diagram of an example projection system of an example Surround Video Projection System that includes a dynamic capture engine for producing a dynamic capture of a VR immersive experience.

FIG. 3 is a block diagram of an example projection system of an example Surround Video Projection System that includes a dynamic capture engine for producing a dynamic capture of a VR immersive experience. Here the dynamic capture engine 302 is shown as a component of the projection system 204 that was described with reference to FIG. 2. The dynamic capture engine 302 may be implemented as a separate discrete component outside of the projection system 204 and communicatively connected to it.

As shown in FIG. 3, once the projection mapping engine 206 receives a video stream from video capture cards 205, it recombines the received video into an equirectangular map. The equirectangular map is stitched, warped, masked, and/or optimized for display onto a surface (such as the portion of the sphere 100 depicted in FIG. 1) by one or more display systems, for example, projectors 207a-207d. This equirectangular map is also available to be forwarded (e.g., streamed, transferred, sent, etc.) to the dynamic capture engine 302.

Meanwhile, a plurality of video cameras (like a Microsoft KINECT camera), which take videos through tiny perforations in the projection screen (e.g., perforations 110a), are recording video data that is forwarded to the dynamic capture engine 302 to produce (by calculating, determining, and the like) volumetric capture data of the objects in the SVPS. This volumetric capture data is captured and processed using the enhanced volumetric capture process described with reference to FIG. 4 and is ultimately composited with the equirectangular map already streamed to the dynamic capture engine 302. This composited result (equirectangular map with volumetric objects) yields a real time video capture 303 which can then be streamed to an external VR device such as headset 306. A representation of the composited equirectangular map with the captured volumetric objects is shown as equirectangular map 304. Note that the composited result of equirectangular map with volumetric objects as equirectangular map 304 can be dynamically composited real time in relation to the position and viewpoint of the user wearing the VR headset 306. This allows the correct view of the 3D volumetric captured object to be rendered for the relative position and orientation of the user's eyes in the virtual environment by the Real Time Rendering System 201 of FIGS. 2 and 3.

In some instances, the dynamic video capture can be turned on and off like a "recording" and thus not use extra compute resources when unneeded.

As mentioned, a VR background presents difficulties for performing edge detection to isolate a moving object from the VR background using volumetric capture. Specifically, there is no opportunity to use a "green screen" to isolate a user moving in the SVPS using the volumetric capture techniques that take advantage of the green screen approach: the movement of the user happens only with the environment that is being captured. In addition, the VR background is two dimensional and not three dimensional like the real world. Thus, the edge detection techniques for volumetric capture that utilize depth sensors such as LiDAR will not work "as is." Thus, the dynamic capture engine performs an enhanced volumetric capture technique that takes advantage of its knowledge of the VR background to mathematically cancel it from the volumetric capture of the moving objects inside the SVPS.

Figure 4:
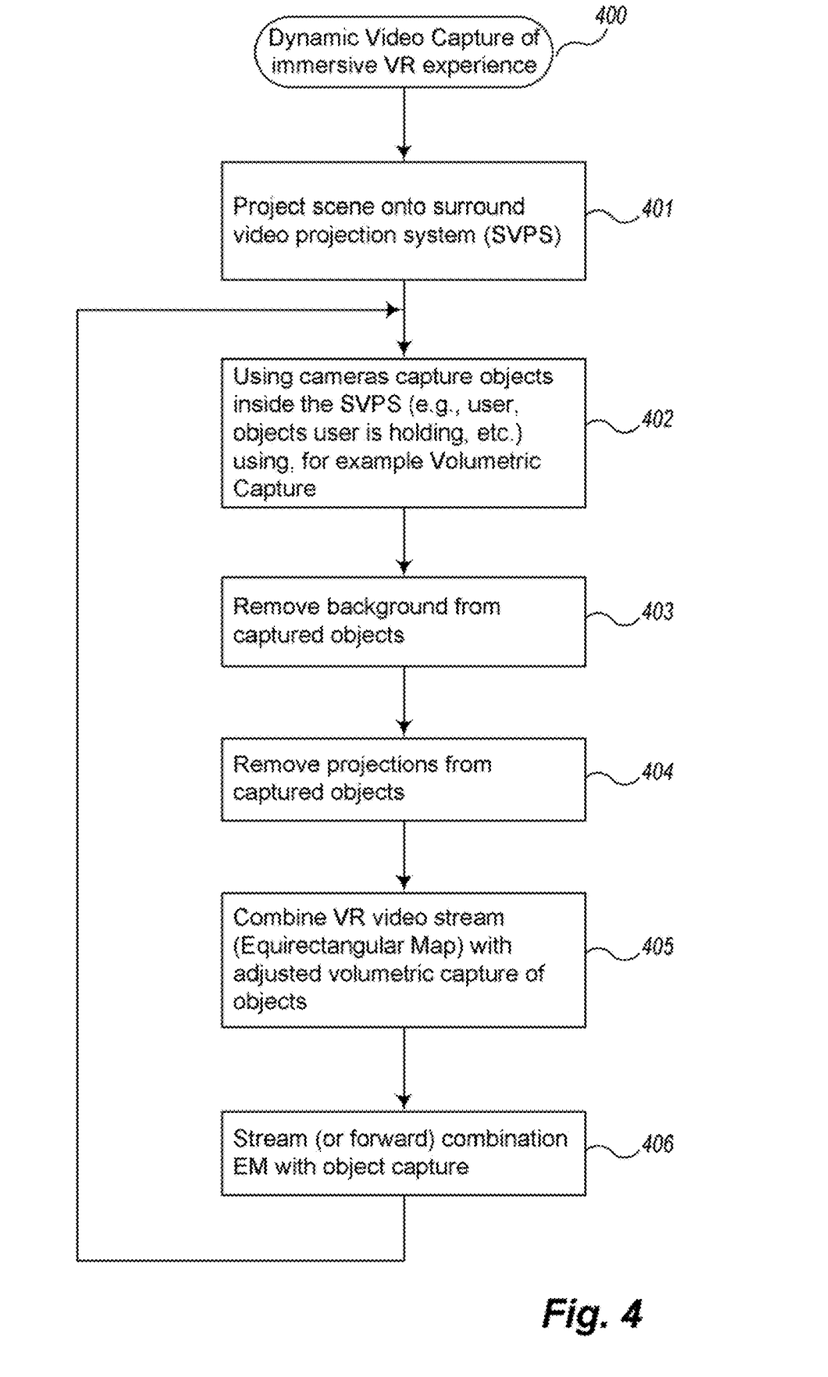
FIG. 4 is an example flow diagram of an enhanced volumetric capturing process used to produce a dynamic video capture of an immersive virtual reality experience in an example Surround Video Projection System.

FIG. 4 is an example flow diagram of an enhanced volumetric capturing process used to produce a dynamic video capture of an immersive VR experience in an example Surround Video Projection System. In block 401, the logic projects a VR scene onto a Surround Video Projection System. For example, this logic may be performed by the projection mapping engine 206 to display a VR scene onto display systems 207a-207d. In block 402, the cameras (e.g., cameras mounted to capture video through perforations 110a of FIG. 1) take video of the inside of the SVPS to video objects from several different angles. To get a 360 degree view, at least 3 cameras are mounted. This video is then processed using volumetric capturing (mathematical) techniques to derive 3D voxels for what each camera is viewing.

In block 403, the "known" background is removed from the captured objects. This is possible because the video being projected is known and can be subtracted from the voxels using noise cancellation techniques. One way to do this is to use volumetric capture technology, and once the voxel point cloud is captured (3D points of what is being photographed), to remove all of the depth pixels that belong on the Surround Video Projection System walls/screen/floor, leaving only the depth pixels within the interior of the SVPS environment (the user's space inside the environment). Specifically, since the surrounding walls/screen/floor are at a known distance from the cameras used to capture the volumetric objects, the logic in block 403 can remove (ignore, discard, etc.) any voxels that are captured at this known distance (and some delta amount inward to account for a margin of error) towards the volumetric capture voxel point cloud. (See also engadget.com/2017/04/19/facebook-surround-360-x24-x6; and Otoy's technology at home.otoy-.com/otoy-facebook-release-revolutionary-6dof-video-vr-camera-pipeline-tools, all of which are incorporated by reference herein in their entireties.) The shape of the "envelope" surrounding the target object can be a different shape than the surrounding walls/screen/floor, which can be taken into account in the removal algorithms. Other techniques may be used, such as that described with reference to block 404 below.

To enhance the effectiveness of these techniques, some example SVPS environments attach some kind of depth sensors or other sensors that associate telemetry information with the user or with specific areas of the SVPS such as the doorway. Thus, the sensors may be passive (e.g., attached to the doorway) or active (e.g., attached to the user). Sensors attached to the user (or other object in the SVPS space) can be sensors like a QR code or RFID wristband or something else that can be worn. This allows the volumetric capturing to detect a person's dark hair against, for example, a dark sky by determining that the voxels associated with a particular area (at a depth location) are associated with a user rather than the VR background, the space inside the environment, or with some other object within the environment. In addition or alternatively, sensors can be attached to the doorway of the SVPS and a profile of the user built as soon as he/she enters the SVPS. This profile can include, for example, the size of the users head, the user's height, arm length, and the like. Alternatively or in addition, placing information out of the visual spectrum that identifies geometry of the SVPS can also be used. Any additional technique that will help the dynamic capture engine subtract out the background (the VR environment) can be incorporated.

In block 404, the dynamic capture engine mathematically removes additional projections from the captured objects. These projections occur because, unlike the real world, the display system will project onto any object (screen or otherwise) in its path. As above, these projections can be removed in the voxel point cloud stage. According to another technique, the dynamic capture engine can compare the captured color of each voxel to an expected color of the voxel that is to be projected onto the screen/walls/floor (the background). Since the source video that is being projected is known as well as any warping and projection mapping, the expected color for each voxel of the projections in the background (without the captured objects) can be known. When an object to be captured (the target object) is introduced into the SVPS space (e.g., the portion of the sphere in FIG. 1), assuming the target object is opaque, the target object will occlude the background projection onto the screen/walls/floor directly behind the target object, in line with the capture camera. This will result in a captured voxel (in the point cloud) that corresponds to a point on the target object volume that does not match the expected color of the voxel that is to be projected onto the background. The dynamic capture engine will keep the voxels in the point cloud having colors that do not match the expected colors for the voxels of the background and discard the voxels with colors that do match. (Note that this technique can be used at block 403 as well.)

In one optimization of this technique, some dynamic capture engines perform a "dry-run" volumetric capture of an empty SVPS space without any objects present to capture the expected color of voxels at each frame of the projected video from the perspective of each capture camera. Assuming that the position of the cameras and the background screen/walls/floor are fixed or unchanged, the set of expected voxel colors becomes the "expected set of voxel colors per frame." When target objects are introduced into the SVPS space, the new set of voxels captured per frame of video represents the "actual set of voxel colors per frame." Processing each set of voxels per frame entails comparing the actual set of voxel colors per frame with the expected set of voxel colors per frame and discarding the voxels whose colors match while keeping the voxels whose colors are different.

Other algorithms can be similarly incorporated.

In block 405, the dynamic capture engine composites the adjusted volumetric capture of objects (with noise and projections removed) with the now being displayed equirectangular map to yield a video stream that is an ad-hoc dynamic capture of the immersive VR experience taking place. This captured recording is then streamed in block 406 so that it can be displayed by an external headset such as headset 306 of FIG. 3.

Augmented Reality in Virtual Reality Environment

In some instances it is desirable to augment the virtual reality environment displayed in a Surround Video Projection System with additional virtual elements. For example, it may be desirable to add virtual elements (objects, people, things, etc.), using a special device such as a VR headset, to the displayed virtualized environment instead of "augmenting reality" which augments the real physical world with virtual elements. Specifically, using augmented reality in a virtual reality environment (also referred to as AR in VR), elements can be placed inside the space formed by the immersive virtual environment. This is particularly hard in an SVPS environment shaped by a portion of a sphere such as that shown in FIG. 1, because there is no projection surface until a projector's image "hits" a screen. Although the projectors 105a-d could indeed display (project) a portion of the VR scene on any object that is in front of the wall it is projecting on, it is difficult to project just an image form on something and not have the projection spill over to hit the wall behind it or floor in its path. Augmented reality can be used to supplement (e.g. augment, complement, etc.) the immersive VR environment displayed to place virtual elements inside the virtual world in a cost effective manner that does not depend upon technologies such as holography that records light wave patterns using typically lasers.

Figure 5:
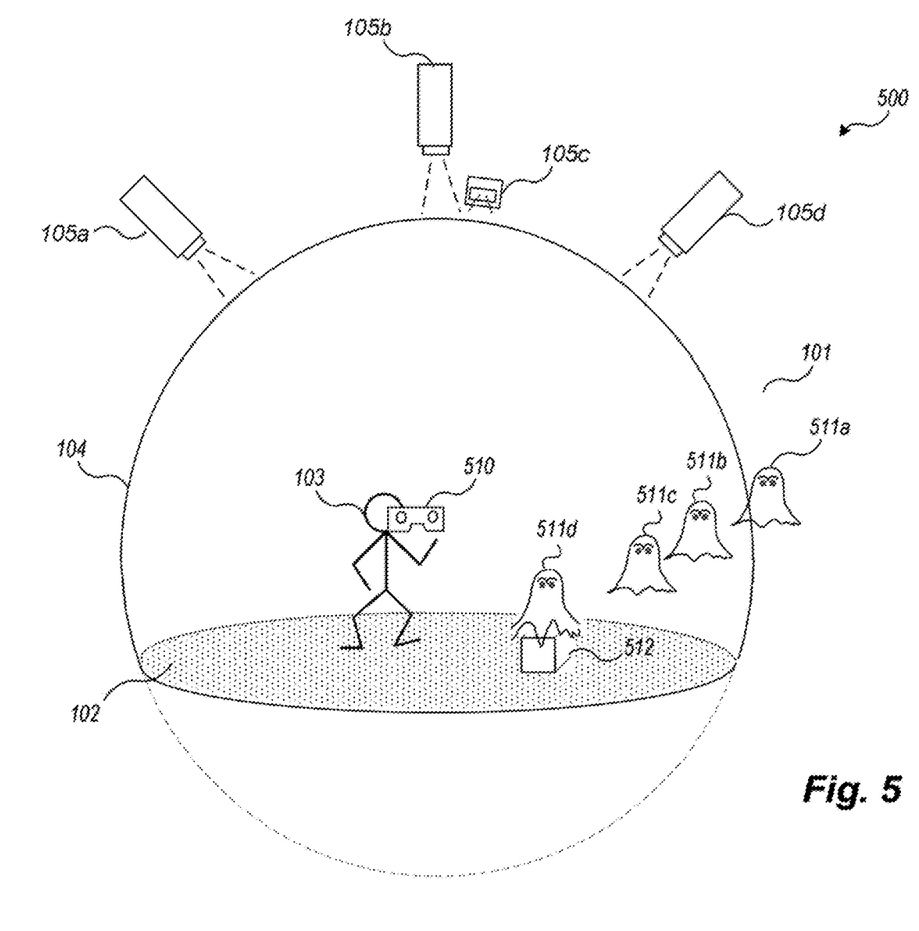
FIG. 5 is an example block diagram illustrating an example Surround Video Projection System used in conjunction with augmented reality.

For example, if the virtual environment is projected as shown in FIG. 1 on the spherical walls 101 and floor 102 of a surround video system 100 that occupies a portion of a sphere, then augmented reality can be used to display additional objects in the interior of that space, which the user can interact with when the user's headset or other VR device is worn. FIG. 5 is an example block diagram illustrating an example Surround Video Projection System used in conjunction with augmented reality. In FIG. 5, the SVPS 101 is shown as in FIG. 1 (with the user 103 artificially enlarged to illustrate the interaction). User 103 is viewing and interacting with an immersive VR environment displayed by projectors 105a-d on the walls 104 and floor 102 of the SVPS 101. User 103 is also wearing VR headset 510 (e.g., Hololens goggles, Oculus Rift goggles, and the like) to allow the user to augment his VR immersive experience. For example, an old haunted hospital with corridors is depicted (not shown) on the walls of SPVS 101. In the depicted scenario a 3D model of a ghost, ghost 511a-511d, is walking "through" one of the corridors to sit in front of the user (511d) on a 3D block 512. Ghost images 511a-511d are intended to depict a sequence of moving images shown to the user as them move through the hospital corridor wall. Thus, the 3D image of the ghost 511a "breaks" through the surface 104 of the SVPS 101 as it moves into the interior space of the SPVS 101 bounded by walls 104.

AR in VR, such as that illustrated with respect to FIG. 5, can be accomplished in the SVPS by the Real Time Rendering System 201 of FIGS. 2 and 3 by using the client-server technology. Specifically, as described above, the rendering system 201 includes a VR/AR gaming engine (e.g., an enhanced Unity Technologies game engine) 202 that generates the video stream sent to the projection system 204. The game engine 202 generates not only the video to be displayed, but generates a server side "gaming" environment that can be used to control and/or communicate with one or more client applications running on devices. This can be set up in a manner similar to how a multi-player gaming engine is set up. The server keeps track of the positions of critical elements in the VR environment and shares these positions as needed with client applications running on the client devices such as headset 510 in FIG. 5.

For example, in the haunted hospital scenario, the server may keep track of where the halls, walls, and doors are, where the users viewpoint is within the environment, and other objects within the simulation. These aspects are shared with each client application as the user's view incorporates these aspects (i.e., the user doesn't see what is behind him in the view supported by the AR headset. Thus, the simulation running on the server is considered a "shared simulation." Client devices can query the simulation to detect what is needed. The VR environment is being streamed from the game engine 202 so the properties of the VR environment elements can be forwarded (e.g., sent, communicated, transferred, etc.) to the client headset 510 as needed. As long as the position of the cameras on the game engine (VR) side 202 is synched up with the position of the viewpoint of the user 103 wearing the headset 510, synchronized AR in VR is possible. How the AR elements are actually presented is device dependent—any kind of AR device will work.

Details on how a typical game engine such as the Unity Technologies game engine can be set up to support this type of client-server multiple player gaming can be found in the Unity Manuals, and in particular the Networking Manager, Concepts, and High Level API sections at docs.unity3d.com/Manual.

Interactivity in a Surround Video Projection System

In some scenarios, it is desirable to have the VR environment adapt to various metrics in the physical and/or virtual world. For example, to promote interactivity and to enhance the immersive experience, it may be desirable for the user be able to touch various elements in the VR world or even have control aspects of the VR environment passively or actively to allow the user to better "feel" the environment.

Figure 6:
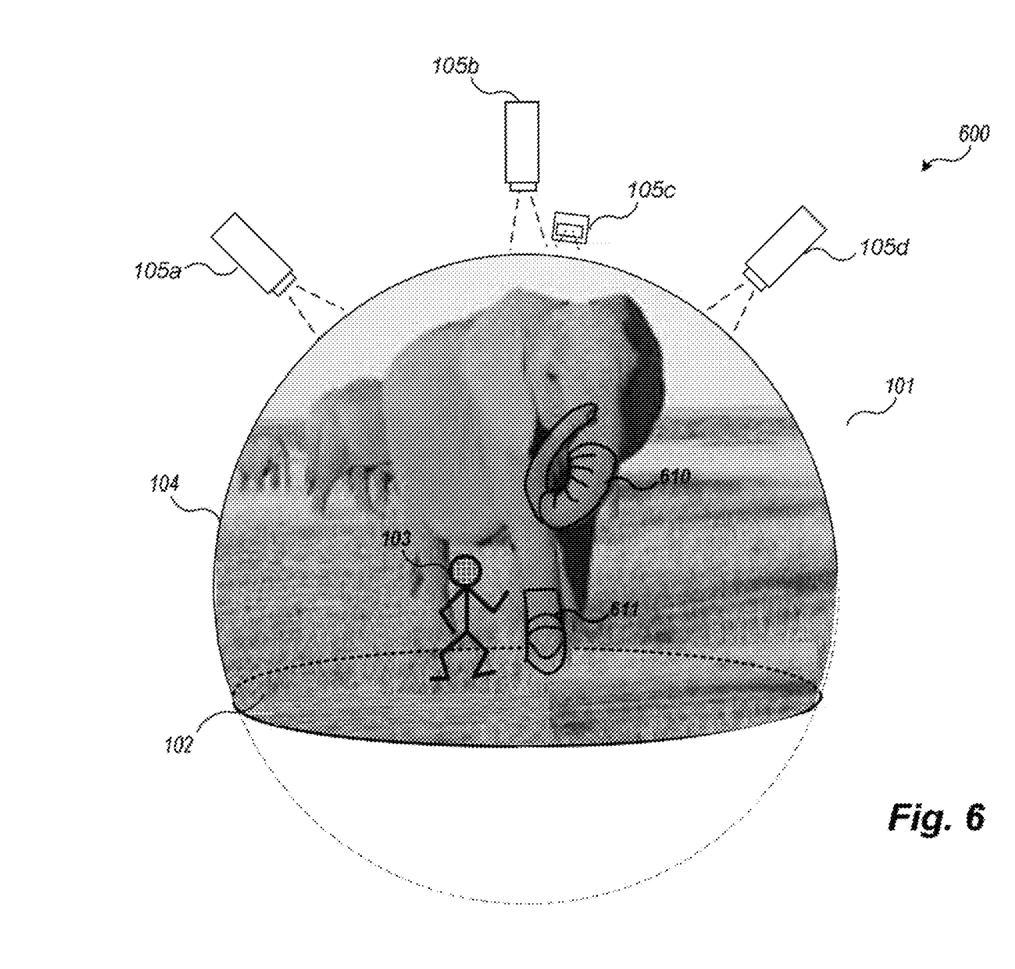
FIG. 6 is an illustration of an example Surround Video Projection System with portions of the screen deformable for use with a virtual reality environment.

For example, in one scenario, the "screen" or other display surface of the Surround Video Projection System (e.g., a portion of a wall) is adjusted so that it can be "deformed" in real time to present an element or a portion of an element of the VR environment. FIG. 6 is an illustration of an example Surround Video Projection System with portions of the screen deformable for use with a virtual reality environment. In FIG. 6, deformations 610 and 611 allow a portion of the projection on the wall 104 to physically come into the inner area of the SVPS 101. For example, in one virtual reality simulation involving a heard of elephants in their native land, as one of the elephants walks towards the user 103, the elephant's foot appears to step out of the screen as the screen deforms into deformation 611. In addition, the elephant's trunk appears to come out of the screen as the screen deforms into deformation 612. These two deformations can make the elephant's advances seem more real to the user. These actions can be performed using actuators (not shown) behind surface 104 that are controllable by the Real Time Rendering System 201 based upon the VR environment being streamed. The wall 104 can be made of any stretchable, elastic, likely woven, material that has elastic properties—therefore allowing it to return back to its original shape when the deformation and associated projection is completed. If the user 103 touches the deformation, such as deformations 610 or 611, the game engine (RT Rendering System 201) needs to respond by changing the actuators to deform appropriately in response to the user's touch.

In order to produce this effect while the VR environment is streaming, a real time scan of the desired deformation is conducted to enable the element or portion of the element to be displayed on the deformation. In some cases the scanning process is too time consuming to perform in real time and the deformation can be pre-calculated (the initial deformation will likely be known because the VR projection is known). Technology for scanning a 3D formation for future real time 3D projection (in motion) has been demonstrated, for example at the 2016 Grammy Awards. Lady Gaga performed with projected makeup or replacement skins that were changed throughout her performance based upon earlier pre-scans of her face and real-time face tracking based upon infrared markers placed discretely on her face. Once the face tracking is detected, the computer determines exact angles, rotations, and axes and in real time is able to adjust the computer generated projection accordingly to properly position the streamed projection on her facial features. (See vanityfair.com/hollywood/2016/02/lady-gaga-2016-grammys-davis-bowie-performance-video; see also technology from OptiTrack at vimeo.com/103425574, both of which are incorporated by reference in their entireties.) Similar techniques can be used here to stream projections onto deformations 610 and 611 in the wall 104 to correspond to the elephant's trunk and foot, respectively.

In some SVPS environments, a designated portion of the wall 104 such as a 2'×2' section is fitted with actuators mounted for this purpose. In other SVPS environments a different size section can be accommodated. The idea is to have a specific controlled region that can deform and respond to touch. Depending upon the particular deformations desired, different types of actuators and different sizes may be mounted on or attached to the wall 104. In one SVPS, the actuators are attached in a manner that they can rotate behind the wall 104 as needed based upon the content of the video.

Also, different haptic effects can be accommodated by controlling the actuators in response to a user touching a deformation. In addition, other aspects of the environment can be changed, such as adding wind effects (e.g., using fans), temperature changes (e.g., using heaters/coolers) and motion/vibration effects (e.g., by beaming audio to a specific person or location). These environmental effects can contribute to the immersive experience. In addition, these effects can be produced at a room scale without the user having to wear a head mounted display or other AR/VR device.

In addition, means for tracking facial expressions (such as biometric sensors, facial tracking, and the like) can be used to determine a user's emotive response. This feedback is shown as user input/feedback 210 in FIG. 2. Different environmental effects can be invoked responsive to detection of particular facial expressions that yield cognitive clues about how the user is interacting with or feeling about the VR environment. For example, if the user appears anxious, a fan might be turned on to bring the temperature in the room down.

Further, in some SVPS installations, artificial intelligence (AI) algorithms can be used in conjunction with biometric data to change the story line shown in the VR experience based upon detected states of the user such as the user's mental, emotional, physical, and social state. For example, if the user appears to be scared, the rendering system (the gaming engine) could cause a more calming portion of the story to be streamed as determined in conjunction with the AI algorithms or perhaps the music accommodating the video could be changed. The user might be queried before the VR experience to add additional profile information to use as input to the storyline. Different story lines can be accommodated by dividing the VR video into chapters or other smaller units (segments) that can be selected ad hoc using meta data associated with the VR video segment. Other aspects that can be used as meta data include emotional state, age, ratings, and the like.

The SVPS may also support a mode for a user defining his or her own adventure. Based upon answers to questions asked by the system and/or biometric feedback, the SVPS can create an experience using the various segments of video available in conjunction with artificial intelligence or machine learning algorithms. These algorithms can be used to generate the correct or desired content or to decide what the user is looking at or how the user is "feeling" based upon biometric feedback.

A user's height can be similarly accommodated by the SVPS using RT scanning. In particular, if a user's height can be determined a priori or in real time, then the projection system (e.g. projection system 204 of FIG. 2) can adjust the mappings of the video to better accommodate the user's height. Or, different video streams can be made available best upon different heights and the most appropriate segments selected in response to determining the user's height. Similar accommodations can be made by the real time rendering system in response to any user input or feedback.

Example Computing Systems

Figure 7:
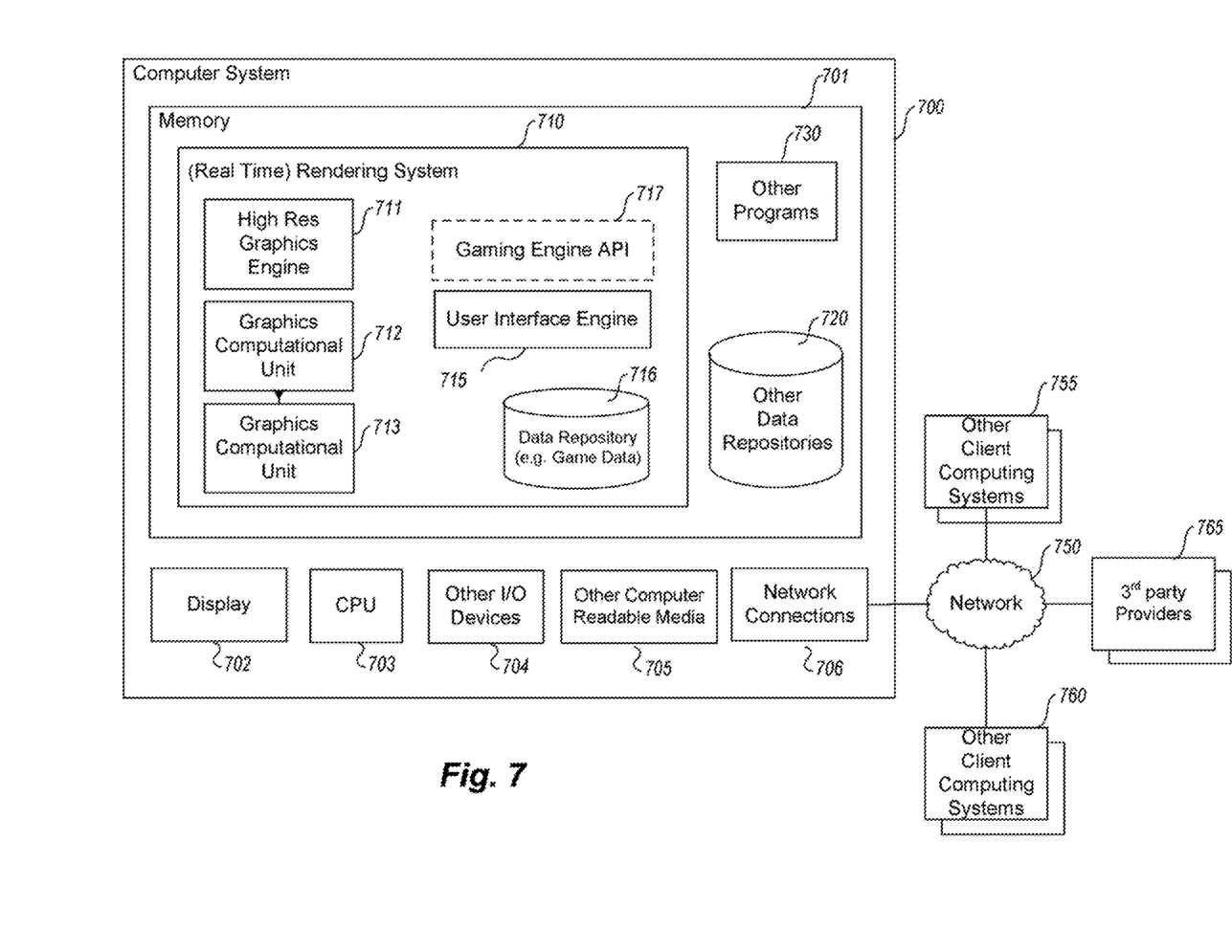
FIG. 7 is an example block diagram of a computing system for practicing embodiments of a rendering system of an example Surround Video Projection System.

FIG. 7 is an example block diagram of a computing system for practicing embodiments of a rendering system of an example Surround Video Projection System. Note that one or more general purpose virtual or physical computing systems suitably instructed or a special purpose computing system may be used to implement the rendering system of an example SVPS. Further, these systems may be implemented in software, hardware, firmware, or in some combination to achieve the capabilities described herein.

Note that one or more general purpose or special purpose computing systems/devices may be used to implement the described techniques. However, just because it is possible to implement the rendering system on a general purpose computing system does not mean that the techniques themselves or the operations required to implement the techniques are conventional or well known.

The computing system 700 may comprise one or more server and/or client computing systems and may span distributed locations. In addition, each block shown may represent one or more such blocks as appropriate to a specific embodiment or may be combined with other blocks. Moreover, the various blocks of the rendering system 710 may physically reside on one or more machines, which use standard (e.g., TCP/IP) or proprietary interprocess communication mechanisms to communicate with each other, although the graphics aspects of this computing system is likely to reside on a single machine for speed and bandwidth delivery.

In the embodiment shown, computer system 700 comprises a computer memory ("memory") 701, a display 702, one or more Central Processing Units ("CPU") 703, Input/Output devices 704 (e.g., keyboard, mouse, CRT or LCD display, etc.), other computer-readable media 705, and one or more network connections 706. The rendering system 710 is shown residing in memory 701. In other embodiments, some portion of the contents, some of, or all of the components of the rendering system 710 may be stored on and/or transmitted over the other computer-readable media 705. The components of the rendering system 710 preferably execute on one or more CPUs 703 and manage the generation of streamed video data, as described herein. Other code or programs 730 and potentially other data repositories, such as data repository 720, also reside in the memory 701, and preferably execute on one or more CPUs 703. Of note, one or more of the components in FIG. 7 may not be present in any specific implementation. For example, some embodiments embedded in other software may not provide means for user input or display.

In a typical embodiment, the rendering system 710 includes one or more high resolution graphics display engines 711 (such as a Unity Game engine described above), one or more graphics computation units (e.g., GPUs) 712, and 713, a user interface engine 715. A data repository 716 for storing game related data, and optionally gaming engine API 717 for accessing and controlling the graphics engine 711 and/or data 716. In at least some embodiments, the data repository 716 is provided external to the rendering system and is available, potentially, over one or more networks 750. Such data is not likely data requiring speed or responsiveness, for example, profile data may be stored this way. Other and/or different modules may be implemented. In addition, the rendering system 710 may interact via a network 750 with other client computing systems 755 and 760, and/or one or more third-party information provider systems 765, such as advertiser systems that supply integrated advertisements into the streaming video.

In an example embodiment, components/modules of the rendering system 710 are implemented using standard programming techniques. For example, the rendering system 710 may be implemented as a "native" executable running on the CPU 103, along with one or more static or dynamic libraries. In other embodiments, the rendering system 710 may be implemented as instructions processed by a virtual machine. In general, a range of programming languages known in the art may be employed for implementing such example embodiments, including representative implementations of various programming language paradigms, including but not limited to, object-oriented (e.g., Java, C++, C#, Visual Basic. NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

In some scenarios, the embodiments described above may also use well-known or proprietary, synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously and communicate using message passing techniques. Equivalent synchronous embodiments are also supported.

In addition, programming interfaces to the data stored as part of the rendering system 710 (e.g., in the data repository 716) can be available by standard mechanisms such as through C, C++, C#, and Java APIs; libraries for accessing files, databases, or other data repositories; through scripting languages such as XML; or through Web servers, FTP servers, or other types of servers providing access to stored data. The data repository 716 may be implemented as one or more database systems, file systems, or any other technique for storing such information, or any combination of the above, including implementations using distributed computing techniques.

Also the example rendering system 710 may be implemented in a distributed environment comprising multiple, even heterogeneous, computer systems and networks. Different configurations and locations of programs and data are contemplated for use with techniques of described herein. Also, one or more of the modules may themselves be distributed, pooled or otherwise grouped, such as for load balancing, reliability or security reasons. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, etc.) and the like. Other variations are possible. Also, other functionality could be provided by each component/module, or existing functionality could be distributed amongst the components/modules in different ways, yet still achieve the functions of an rendering system.

Furthermore, in some embodiments, some or all of the components of the rendering system 710 may be implemented or provided in other manners, such as at least partially in firmware and/or hardware, including, but not limited to one or more application-specific integrated circuits (ASICs), standard integrated circuits, controllers executing appropriate instructions, and including microcontrollers and/or embedded controllers, field-programmable gate arrays (FPGAs), complex programmable logic devices (CPLDs), and the like. Some or all of the system components and/or data structures may also be stored as contents (e.g., as executable or other machine-readable software instructions or structured data) on a computer-readable medium (e.g., a hard disk; memory; network; other computer-readable medium; or other portable media article to be read by an appropriate drive or via an appropriate connection, such as a DVD or flash memory device) to enable the computer-readable medium to execute or otherwise use or provide the contents to perform at least some of the described techniques. Some or all of the components and/or data structures may be stored on tangible, non-transitory storage mediums. Such computer program products may also take other forms in other embodiments. Accordingly, embodiments of this disclosure may be practiced with other computer system configurations.

Figure 8:
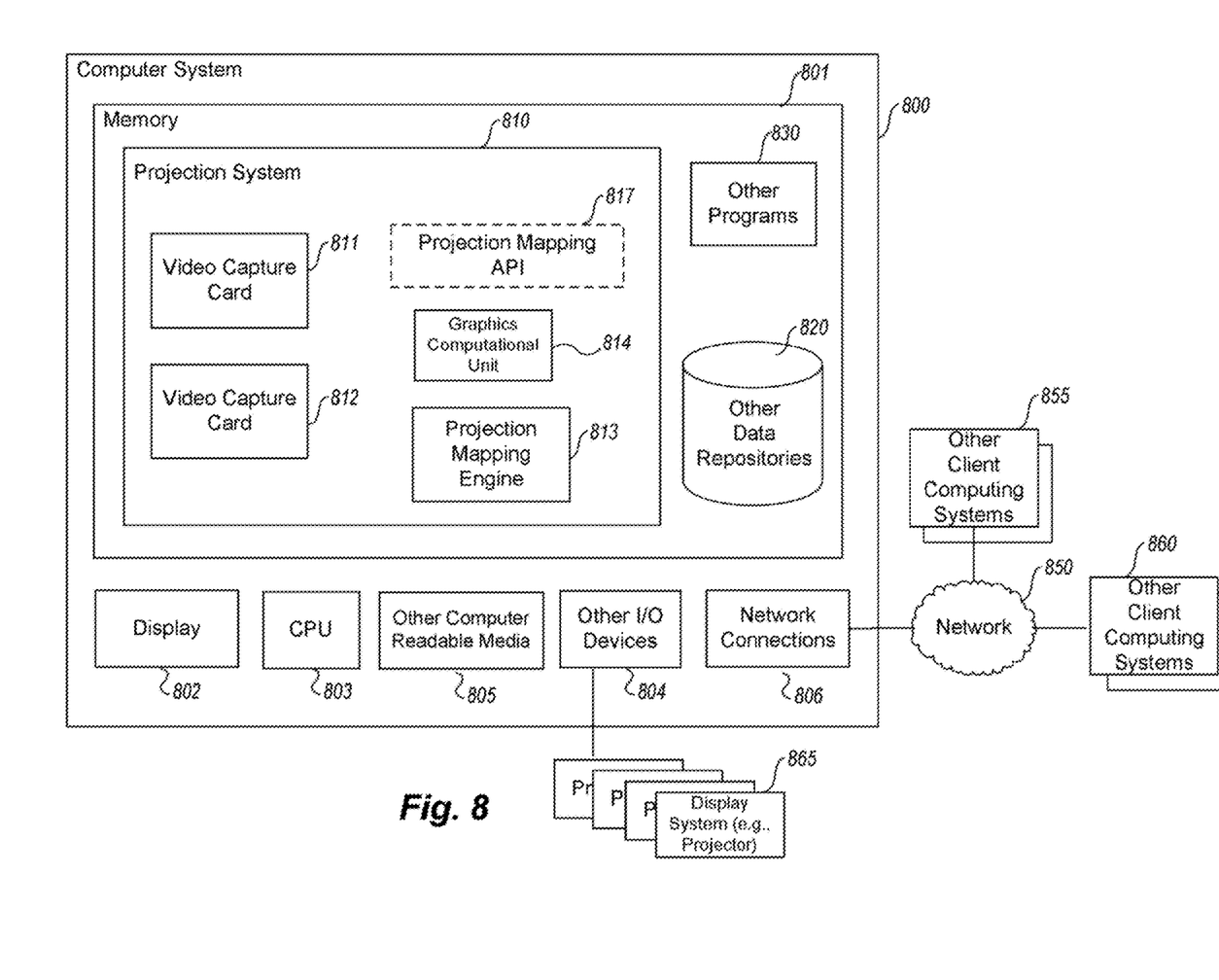
FIG. 8 is an example block diagram of a computing system for practicing embodiments of a projection system of an example Surround Video Projection System.

FIG. 8 is an example block diagram of a computing system for practicing embodiments of a projection system of an example Surround Video Projection System. The computing system of FIG. 8 operates similarly to the computing system for practicing embodiments of the rendering system of FIG. 7, except that it contains potentially different components.

For example, in the embodiment shown, computer system 800 comprises a computer memory ("memory") 801, a display 802, one or more Central Processing Units ("CPU") 803, Input/Output devices 804, other computer-readable media 805, and one or more network connections 806. The projection system 810 is shown residing in memory 801. In other embodiments, some portion of the contents, some of, or all of the components of the projection system 810 may be stored on and/or transmitted over the other computer-readable media 805. The display systems (e.g., projectors) 865 are shown connected to the projection system 810 through I/O device interface 804. The components of the projection system 810 preferably execute on one or more CPUs 803 and manage the capture and projection of streamed video data, as described herein. Other code or programs 830 and potentially other data repositories, such as data repository 820, also reside in the memory 801, and preferably execute on one or more CPUs 803. Of note, one or more of the components in FIG. 8 may not be present in any specific implementation. For example, some embodiments embedded in other software may not provide means for user input or display.

In a typical embodiment, the projection system 810 includes one or more video capture cards 811 and 812 as described herein, a projection mapping engine 813, a graphics computation unit (e.g., GPU) 814, and optionally a projection mapping API 817 that is available through standard API mechanisms. These components can be distributed or combined, implemented using standard programming techniques, use synchronous or asynchronous methodologies, etc., as described with reference to FIG. 7.

Different configurations and locations of programs and data are contemplated for use with techniques of described herein. In addition, the rendering system 710 and projection system 810 may be physical or virtual computing systems and may reside on the same physical system. Also, one or more of the modules may themselves be distributed, pooled or otherwise grouped, such as for load balancing, reliability or security reasons. A variety of distributed computing techniques are appropriate for implementing the components of the illustrated embodiments in a distributed manner are contemplated. Also, other functionality could be provided by each component/module, or existing functionality could be distributed amongst the components/modules in different ways, yet still achieve the functions of an projection system.

Furthermore, in some embodiments, some or all of the components of the projection system 810 may be implemented or provided in other manners, such as at least partially in firmware and/or hardware, including, but not limited to one or more application-specific integrated circuits (ASICs), standard integrated circuits, controllers executing appropriate instructions, and including microcontrollers and/or embedded controllers, field-programmable gate arrays (FPGAs), complex programmable logic devices (CPLDs), and the like. Some or all of the system components and/or data structures may also be stored as contents (e.g., as executable or other machine-readable software instructions or structured data) on a computer-readable medium (e.g., a hard disk; memory; network; other computer-readable medium; or other portable media article to be read by an appropriate drive or via an appropriate connection, such as a DVD or flash memory device) to enable the computer-readable medium to execute or otherwise use or provide the contents to perform at least some of the described techniques. Some or all of the components and/or data structures may be stored on tangible, non-transitory storage mediums. Such computer program products may also take other forms in other embodiments. Accordingly, embodiments of this disclosure may be practiced with other computer system configurations.

All of the above U.S. patents, U.S. patent application publications, U.S. patent applications, foreign patents, foreign patent applications and non-patent publications referred to in this specification and/or listed in the Application Data Sheet, including but not limited to U.S. Provisional Patent Application No. 62/526,305, filed on Jun. 28, 2017, which application is incorporated herein by reference in its entirety.

From the foregoing it will be appreciated that, although specific embodiments have been described herein for purposes of illustration, various modifications may be made without deviating from the spirit and scope of the invention. For example, the methods and systems for performing generation and projection of streamed video data discussed herein are applicable to other architectures other than a personal computer architecture. Also, the methods and systems discussed herein are applicable to differing protocols, communication media (optical, wireless, cable, etc.) and devices (such as wireless handsets, electronic organizers, personal digital assistants, portable email machines, game machines, pagers, navigation devices such as GPS receivers, etc.).

The invention claimed is:
1. A computer-implemented capture system for dynamically capturing a streamed video experience, comprising:

a surround video projection environment comprising:
walls and/or screens with a plurality of small perforations behind which are situated one or more video cameras, wherein the walls and/or screens define an interior space and wherein the one or more video cameras are configured to record streamed video of one or more elements in the interior space of the surround video projection environment defined by the walls and/or screens while the surround video projection environment is displaying a virtual environment on the walls and/or screens; and a dynamic capture engine, configured to:
receive streamed video data in substantially real time from the one or more video cameras;
determine, from volumetric capture data of one or more elements located in the interior space of the surround video projection environment, one or more potential elements;
remove the displayed virtual environment from each of the one or more potential elements to provide edge detection for the one or more potential elements in order to isolate one or more detected elements from the displayed virtual environment;
remove projections of the displayed virtual environment onto the one more detected elements from each detected element to generate a captured element corresponding to each detected element;
generate a composited video stream that includes the captured one or more elements composited with the displayed virtual environment; and
store the generated composited video stream;
wherein the stored composited video stream is configured to be streamed by a virtual reality device.

2. The capture system of claim 1 wherein the dynamic capture engine is part of the surround video projection environment.

3. The capture system of claim 1 wherein the composited video stream is an equirectangular map composited with the isolated one or more elements.

4. The capture system of claim 1 wherein the edge detection for each element is determined by subtracting out the displayed virtual environment from the volumetric capture data for each element using noise cancellation algorithms.

5. The capture system of claim 1 wherein the edge detection for each element is based in part upon LiDAR depth detection data from LiDAR devices.

6. The capture system of claim 1 wherein projections onto each of the one or more elements are removed by subtracting out the displayed virtual environment using noise cancellation algorithms.

7. The capture system of claim 1 wherein the virtual reality device is a headset.

8. The capture system of claim 1 wherein the stored composited video stream is configured to be streamed by a virtual reality device that is external to the surround video projection environment.

9. The capture system of claim 1 wherein the streamed composited video stream is forwarded to recreate the captured virtual environment at a later time outside the surround video projection environment.

10. The capture system of claim 9 wherein the captured virtual environment is part of a simulation used to assess a user participating in the simulation.

11. The capture system of claim 10 wherein the simulation employs a fitness program or a rehabilitation environment.

12. The capture system of claim 10 wherein the simulation provides a safe environment for training personnel.

13. A computer-implemented method for dynamically capturing a streamed video experience, comprising:
displaying a virtual environment onto walls or screens of a surround video projection environment;
using cameras situated behind the walls or screens to view through perforations, capturing video of an interior space of the surround video projection environment defined by the walls or screens while the virtual environment being display;
determining, from volumetric capture data of each of one or more elements located in the interior space of the surround video projection environment, one or more potential elements;
removing the displayed virtual environment from each of the one or more potential elements to provide edge detection to generate one or more detected elements;
removing projections of the displayed virtual environment from each detected element to generate a captured element corresponding to each detected element; and
combining the displayed virtual environment with the captured elements in a video stream and forwarding the video stream for separate consumption.

14. The method of claim 13 wherein the video stream is configured to be played back by an external headset.

15. The method of claim 13 wherein the virtual environment is a 360 degree video.

16. The method of claim 13 wherein the displayed virtual environment is a simulation of a live event.

17. The method of claim 13, further comprising:
receiving sensor data to profile physical attributes of a user to enhance the volumetric capture data.

18. The method of claim 13 wherein the virtual environment depicts a musical or stage performance.

19. A non-transitory computer-readable storage medium including instructions that control one or more computer processors to execute a method comprising:
displaying a virtual environment onto walls or screens of a surround video projection environment;
using cameras situated behind the walls or screens to view through perforations, capturing video of an interior space of the surround video projection environment defined by the walls or screens while the virtual environment being displayed;
determining, from volumetric capture data of each of one or more elements located in the interior space of the surround video projection environment, one or more potential elements;
removing the display virtual environment from each of the one or more potential elements to provide edge detection to generate one or more detected elements;
removing projections of the displayed virtual environment from each detected element to generate a captured element corresponding to each detected element; and
combining the displayed virtual environment with the captured elements in a video stream and forwarding the video stream for separate consumption.

20. A non-transitory computer-readable storage medium including instructions that control one or more computer processors to perform a method comprising:
receiving streamed video data in substantially real time from one or more video cameras located behind a display surface in a video projection environment while the environment is currently displaying a 360 degree virtual environment, wherein the 360 degree virtual environment defines an interior space of the video projection environment;

determining volumetric capture data of one or more elements located in the interior space of the video projection environment;

isolating the one or more elements by removing the displayed virtual environment to provide edge detection to isolate each element from the displayed virtual environment;

removing projections of the displayed virtual environment onto the one or more isolated elements from each isolated element to generate a captured element;

generating a composited video stream that includes the captured one or more elements composited with the displayed virtual environment; and storing the generated composited video stream;

wherein the stored composited video stream is configured to be streamed by an external virtual reality device.

* * * * *